(12) United States Patent
Potnis (10) Patent No.: US 10,500,537 B2
(45) Date of Patent: Dec. 10, 2019

(54) REGENERATING BREATHERS SYSTEM

(71) Applicant: Easun—MR Tap Changers (P) LTD, Tamil Nadu (IN)

(72) Inventor: Shrikant Balkrishna Potnis, Nasik (IN)

(73) Assignee: EASUN-MR TAP CHANGERS (P) LTD, Tamil Nadu (IN)

( * ) Notice: Subject to any disclaimer, the term of this patent is extended or adjusted under 35 U.S.C. 154(b) by 84 days.

(21) Appl. No.: 15/740,823

(22) PCT Filed: Dec. 21, 2015

(86) PCT No.: PCT/IN2015/000452
§ 371 (c)(1),
(2) Date: Dec. 29, 2017

(87) PCT Pub. No.: WO2017/002128
PCT Pub. Date: Jan. 5, 2017

(65) Prior Publication Data
US 2018/0185781 A1    Jul. 5, 2018

(30) Foreign Application Priority Data
Jul. 1, 2015 (IN) .......................... 2516/MUM/2015

(51) Int. Cl.
*B01D 53/04* (2006.01)
*H01F 27/14* (2006.01)
*B01D 53/26* (2006.01)

(52) U.S. Cl.
CPC ..... *B01D 53/0462* (2013.01); *B01D 53/0407* (2013.01); *B01D 53/261* (2013.01);
(Continued)

(58) Field of Classification Search
CPC .............. B01D 53/0407; B01D 53/261; B01D 53/0462; B01D 2252/10; B01D 2253/106;
(Continued)

(56) References Cited

U.S. PATENT DOCUMENTS 2,505,581 A * 4/1950 Unger ..................... H01F 27/14
174/14 R
3,594,983 A * 7/1971 Yearout ................ B01D 53/047
95/97

(Continued)

OTHER PUBLICATIONS

International Search Report, PCT/IN2015/000452, dated Nov. 23, 2016.

*Primary Examiner* — Frank M Lawrence, Jr.
(74) *Attorney, Agent, or Firm* — Porzio Bromberg & Newman P.C.

(57) ABSTRACT

An air breather system to dehydrate atmospheric air entering an oil tank includes first and second breathers, first and second desiccator tanks, a control unit, a ventilation fan, four conduits, plurality of valves, moisture absorbent, two heating elements, and two moisture sensors. The first and second breathers work one at a time. The atmospheric air entering the first breather is dehydrated by moisture absorbent present in first desiccator tank and is released to the oil tank. When the moisture absorbent of the first breather absorbs moisture to its full capacity, it is regenerated, and the second breather starts functioning. During regeneration, moisture absorbent is heated by the heating element. Hot air along with the vapours of moisture absorbed by the absorbent generated during regeneration process is sucked by the ventilation fan and released out of the air breather system, without allowing moisture in the hot air to condense.

13 Claims, 4 Drawing Sheets

(52) U.S. Cl.
CPC ......... *H01F 27/14* (2013.01); *B01D 2252/10* (2013.01); *B01D 2253/106* (2013.01); *B01D 2253/11* (2013.01); *B01D 2259/40003* (2013.01)

(58) Field of Classification Search
CPC ...... B01D 2253/11; B01D 2259/40003; H01F 27/14
USPC ....... 96/111, 121, 134, 146; 34/80, 472, 473
See application file for complete search history.

(56) References Cited

U.S. PATENT DOCUMENTS

| | | | | |
|---|---|---|---|---|
| 4,127,395 | A * | 11/1978 | McKey | B01D 53/261 |
| | | | | 95/10 |
| 5,632,802 | A * | 5/1997 | Grgich | B01D 53/0431 |
| | | | | 95/10 |
| 5,667,566 | A * | 9/1997 | Flynn | B01D 53/0415 |
| | | | | 96/117.5 |
| 5,902,381 | A | 5/1999 | Golner et al. | |
| 6,226,888 | B1 * | 5/2001 | Lang | B01D 53/261 |
| | | | | 34/332 |
| 7,332,015 | B2 | 2/2008 | Golner et al. | |
| 2003/0089238 | A1 * | 5/2003 | Viereck | H01F 27/14 |
| | | | | 96/111 |
| 2013/0133221 | A1 | 5/2013 | Carollo et al. | |
| 2014/0053723 | A1 | 2/2014 | Carollo et al. | |
| 2014/0165828 | A1 * | 6/2014 | Martin | B01D 53/261 |
| | | | | 95/26 |
| 2016/0096138 | A1 * | 4/2016 | Martin | B01D 53/261 |
| | | | | 95/114 |

* cited by examiner

REGENERATING BREATHERS SYSTEM

BACKGROUND

Field of Invention

The present invention generally relates to an air breather. More specifically, the present invention relates to an air desiccator regenerating breather system which is used to provide dehydrated air to an oil conservator of an electrical device.

BACKGROUND OF THE INVENTION

Oil is used as an insulating medium and coolant in electrical devices, such as power transformers, on-load tap-changers, power chokes, etc. A power transformer is an electrical device which is used to transfer alternating current (AC) power over long distance. The power transformer receives AC power at one voltage and delivers AC power at another voltage. The power transformer has winding coils corresponding to number of phases. The winding coils further include low voltage windings and high voltage windings. The high voltage and low voltage windings are generally placed concentrically. The power transformer is immersed in a tank that houses oil (hereinafter referred to as "oil tank"). Power transfer from low voltage winding to high voltage winding that leads to various energy losses. These energy losses are dissipated in the form of heat energy. The heat energy generated is absorbed by the oil. The oil dissipates the heat energy absorbed to the environment via radiators. When the oil absorbs the heat energy, the oil expands thus causing an increase in a volume thereof. The change in the volume of the oil is accommodated by a conservator tank by pushing out air from the conservator tank. The conservator tank is connected to the oil tank. Pushing out the air from the conservator tank is referred to as 'breathing out' of the power transformer. Further, as the oil dissipates the heat energy to the environment and due to reduction in electrical loading of the power transformer, the volume of the oil in the conservator tank decreases. Due to the decrease in the volume of oil inside the conservator tank, air from the environment is sucked in to fill the gap inside the conservation tank. This is referred to as the process of 'breathing in' of the power transformer.

Atmospheric air always has moisture in it and moist air is harmful for insulation of the power transformer. Moist air damages the transformer or electrical equipment. Therefore, it is necessary to ensure that the air sucked by electrical equipment is desiccated. The air is dehydrated by using air breathers. An air breather plays a vital role in dehydrating the air entering electrical devices in which oil is used as insulator and coolant. The air breather provides means to prevent moisture entering the electrical device. Breather includes a dehydrating agent which absorbs moisture present in the air. There are two types of dehydrating agents that can be used in the breather, viz., regenerative agents and non-regenerative agents. The non-regenerative agents absorb moisture up to their threshold. When the threshold limit of a non-regenerative agent is achieved, there is a need to replace the non-regenerative agent. The regenerative agents absorb moisture to their threshold and when the threshold limit of regenerative agent is attained, the moisture content absorbed by the regenerative agents is removed by recycling the regenerative agents.

As described above, the regenerative agent after reaching a humidity set value needs to be dehydrated for reusing the regenerative agent in next cycle. U.S. Publication No. 2013/0133221 and U.S. Publication No. 2014/0053723 describe a similar system to dehydrate the air entering the electrical device and to regenerate the moisture absorbing agent. According to U.S. Publication No. 2013/0133221, the system is referred to as 'dryer' which includes a protective casing, two dehumidifying tanks, two absorption tanks, two heating means, two sensors and two fans. Protective casing of the dryer covers the two dehumidifying tanks. The two dehumidifying tanks further include two absorption tanks. The two absorption tanks further includes an absorption means which is used to absorb moisture from the air. Sensors placed in each dehumidifying tank determine the saturation state of the absorption means. Two fans are placed at the bottom of the two dehumidifying tanks. Heating means are attached to the centre of the two dehumidifying tanks respectively.

The two dehumidifying tanks function one at a time. First dehumidifying tank, with the absorption means, is used to supply humid free air to the conservator tank. A sensor placed inside the first dehumidifying tank determines the saturation state of the absorption means present inside the first dehumidifying tank. Once the first absorption means is exhausted by reaching its threshold value of absorption, regeneration of absorption means associated with first dehumidifying tank starts. At this time, the second dehumidifying tank, with the absorption means is used to supply humid free air to the conservator tank. A sensor placed inside the second dehumidifying tank determines the saturation state of the absorption means. Once the first absorption means inside the second dehumidifying tank is exhausted by reaching its threshold value of absorption, regeneration of absorption means associated with second dehumidifying tank starts, and this cycle continues. Regeneration of absorption means is achieved by heating the absorption means with the heating means present inside the first and second dehumidifying tanks. When the absorption means is heated, the moisture soaked by the first absorption means gets evaporated. Condensate produced at this stage leaks out from the inlet micro-openings of the side walls of the first and second dehumidifying tanks and reaches the collection sumps, from which it is conveyed outside. The ventilation fan placed at the bottom of the first dehumidifying tank for ease of circulation.

In U.S. Publication No. 2014/0053723, instead of two dehumidifying tanks, three different dehumidifying tanks are used. First and second dehumidifying tanks form a first unit which is connected to a first oil expansion vessels and the third dehumidifying tank forms a second unit which is connected to a second oil expansion vessel. The first, second and third dehumidifying tanks alternatively supply dehumidified air to the associated oil-expansion vessels.

The patents described above pose one or more limitations. The ventilation fans are placed at the bottom of two dehumidifying tanks near the inlets, which are for ease of circulation. The top surfaces of two dehumidifying tanks have openings for allowing the dehumidified air to reach the oil tank. There is an inlet in each of the two dehumidifying tanks from where the air enters the dehumidifying tanks for dehumidification and when the first and second tanks undergo regeneration, the moisture absorbed by the absorption means is thrown out of the system through this same inlet. In the regeneration process, as hot air has a tendency to climb up in the dehumidifying tank, when it reaches to the top of dehumidifying tank, hot air changes its state and condenses leaving behind some moisture content in the absorption means. Complete regeneration of absorption means takes about 3 to 4 days, which is a time consuming process. Further, the prior art systems use two or more ventilation fans in each dehumidifying tank, due to which power consumption of these systems is high.

In light of the foregoing discussion, there is a need for an air dehumidification system which supplies dehumidified air to the oil tank and completely regenerates the absorption means within a short period of time, with reduced power consumption.

SUMMARY

An object of the present invention is to overcome shortcomings of the prior art breather systems. The air breather disclosed herein includes first and second breathers and a common ventilation fan. The first and second breathers each include first and second desiccator tanks, first and second inlets, first and second outlets, first and second air filters, first and second heating elements, a moisture absorbent, first and second moisture sensors, a control unit, first, second, third and fourth valves, and first, second, third and fourth conduits.

According to an embodiment of the present invention, the first and the second heating elements and the first and second air filters are placed at the first and second inlets of the first and second desiccator tanks, respectively. The first and the second moisture sensors are placed inside the first and second desiccator tanks. The common ventilation fan is connected to the first and second outlets of the first and second desiccator tanks. The first conduit connects the first outlet and an inlet of oil tank. The second conduit connects the second outlet and the inlet of oil tank. The third conduit connects the first outlet and the ventilation fan. The fourth conduit connects the second outlet and the ventilation fan.

According to an embodiment of present invention, one breather, either the first breather or the second breather will be inhaling at a time. When the oil inside the oil tank gradually cools down, the air breather inhales atmospheric air. The first and the second inlets have opening and closing valves which are controlled by the control unit. The atmospheric air enters the first breather by way of the first inlet. During this time, the second breather is in idle state, as the second inlet is closed. The atmospheric air passes through the first air filter, wherein the dust particles present in the atmospheric air are filtered. The air in the first breather is made to pass through the moisture absorbent disposed in the first breather. The moisture absorbent dehydrates the air and the dehydrated air is released to the oil tank by way of the first outlet. The first moisture sensor simultaneously provides a first moisture value to the control unit. When the moisture value of the moisture absorbent exceeds a threshold value, the control unit closes the first inlet, thereby causing the first breather to undergo a regeneration process. Further, the control unit opens the second inlet, thereby causing the second breather to start inhaling the atmospheric air. The atmospheric air passes through the second air filter, wherein the dust particles present in the atmospheric air are filtered. The air in the second breather is made to pass through the moisture absorbent disposed in the second breather. The moisture absorbent dehydrates the air and the dehydrated air is released to the oil tank by way of the second outlet. The second moisture sensor simultaneously provides a second moisture value to the control unit. When the moisture value of the moisture absorbent exceeds a threshold value, the control unit closes the second inlet, thereby causing the second breather to undergo the regeneration process.

According to an embodiment of the present invention, regeneration is the process of heating the moisture absorbent to extract moisture absorbed by the moisture absorbent. When the moisture value of the moisture absorbent disposed in at least one of the first and second breathers exceeds the threshold value, the control unit switches ON at least one of the first and second heating elements of the first and second breathers, respectively. The moisture absorbent is heated by at least one of the first and second heating elements of the first and second breathers, respectively. The moisture absorbed by the moisture absorbent changes its state to vapour due to hot air. As this hot air is lighter in weight it rise up in the first and second breathers. The ventilation fan creates a partial vacuum environment and the hot air is sucked out of the first and second breathers by way of at least one of the first and second outlets of first and second breathers, respectively and is released out of the system. The moisture is driven out of the system in the vapour form. Hence, there is no condensation of the water vapours thereby making the system very efficient.

According to the embodiment of the present invention, the first and second breathers are efficient breathers as the moisture absorbent disposed in the first and second breathers regenerate quicker than the existing breathers.

BRIEF DESCRIPTION OF DRAWING

The invention is described in detail below with reference to the drawings and examples. Such discussion is for purposes of illustration only. Modifications within the spirit and scope of the present invention, set forth in the appended claims, will be readily apparent to one of skill in the art. Terminology used throughout the specification and claims herein is given its ordinary meaning except as more specifically defined:

DETAIL DESCRIPTION OF EMBODIMENTS

As used in the specification and claims, the singular forms "a", "an" and "the" include plural references unless the context clearly dictates otherwise. For example, the term "an article" may include a plurality of articles unless the context clearly dictates otherwise.

Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the present invention.

There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of system components which constitutes an air breather system that is used to provide dehydrated air to the oil tank. Accordingly, the components and the method steps have been represented, showing only specific details that are pertinent for an understanding of the present invention so as not to obscure the disclosure with details that will be readily apparent to those with ordinary skill in the art having the benefit of the description herein.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1A:
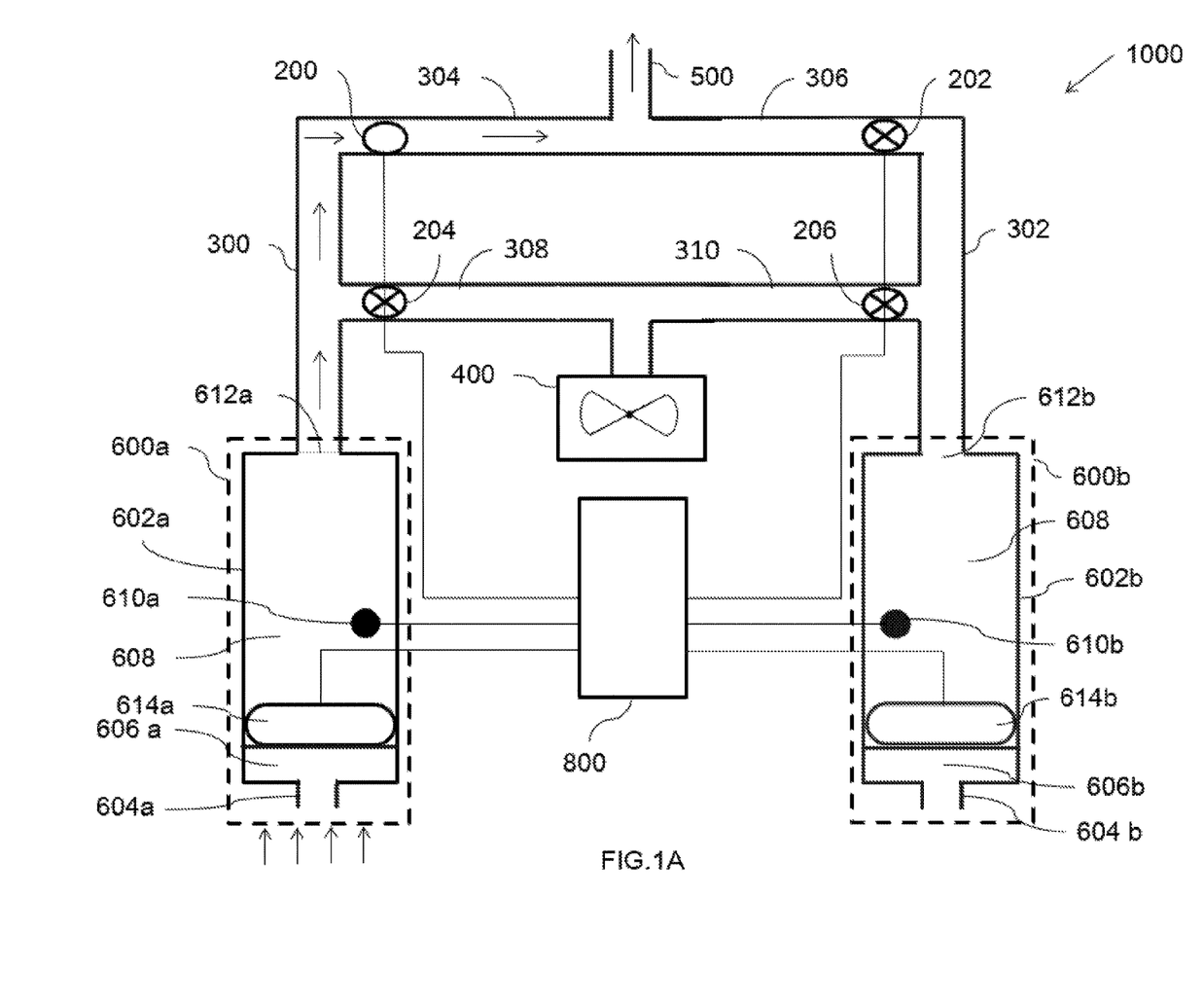
FIG. 1A is a schematic representation of an air breather, where the atmospheric air is flowing through a first breather and a second breather is in an idle state, in accordance with the embodiment of present invention.
Figure 1B:
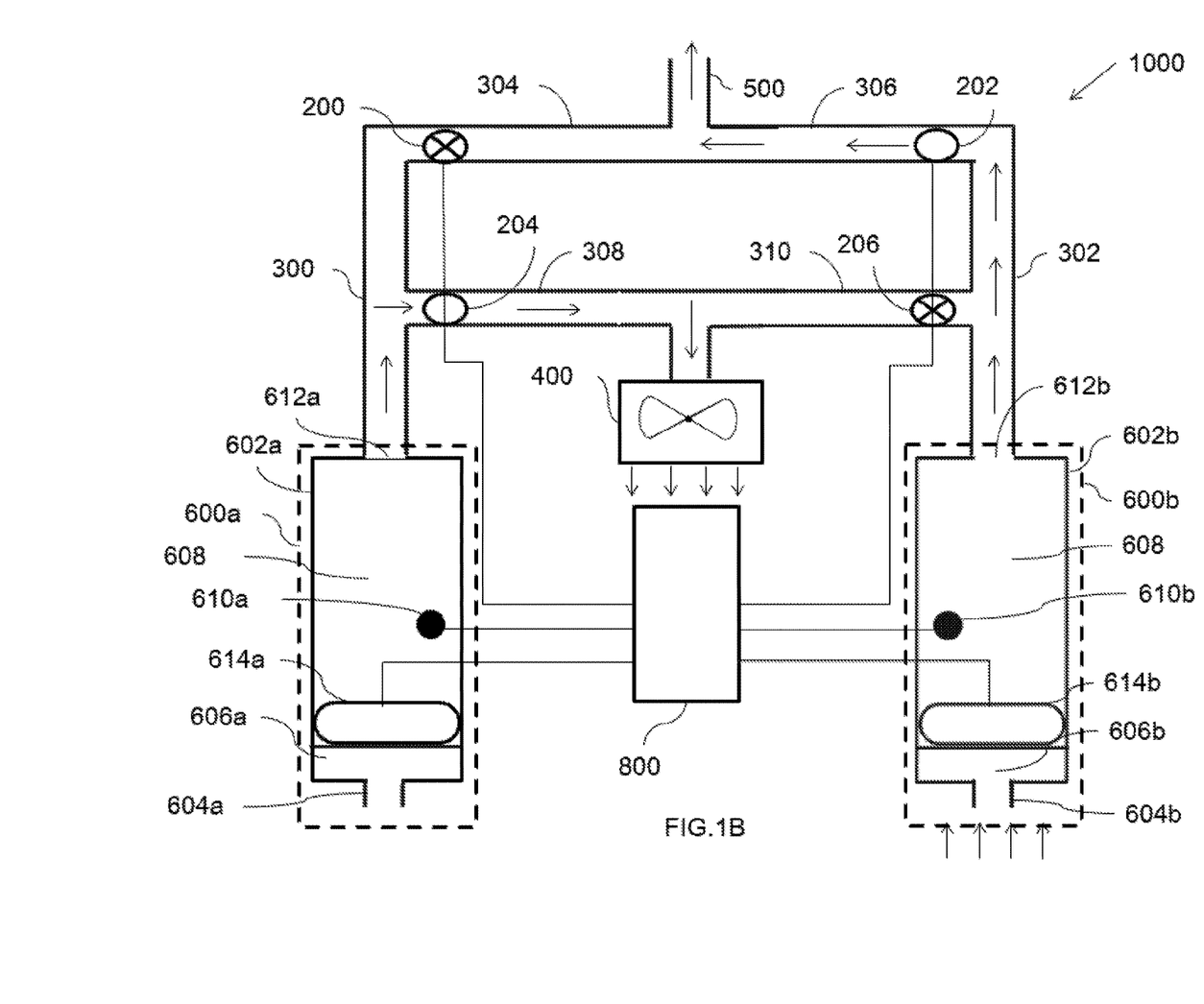
FIG. 1B is a schematic representation of the air breather, where the atmospheric air is flowing through the second breather and the first breather is regenerating, in accordance with the embodiment of present invention.
Figure 1C:
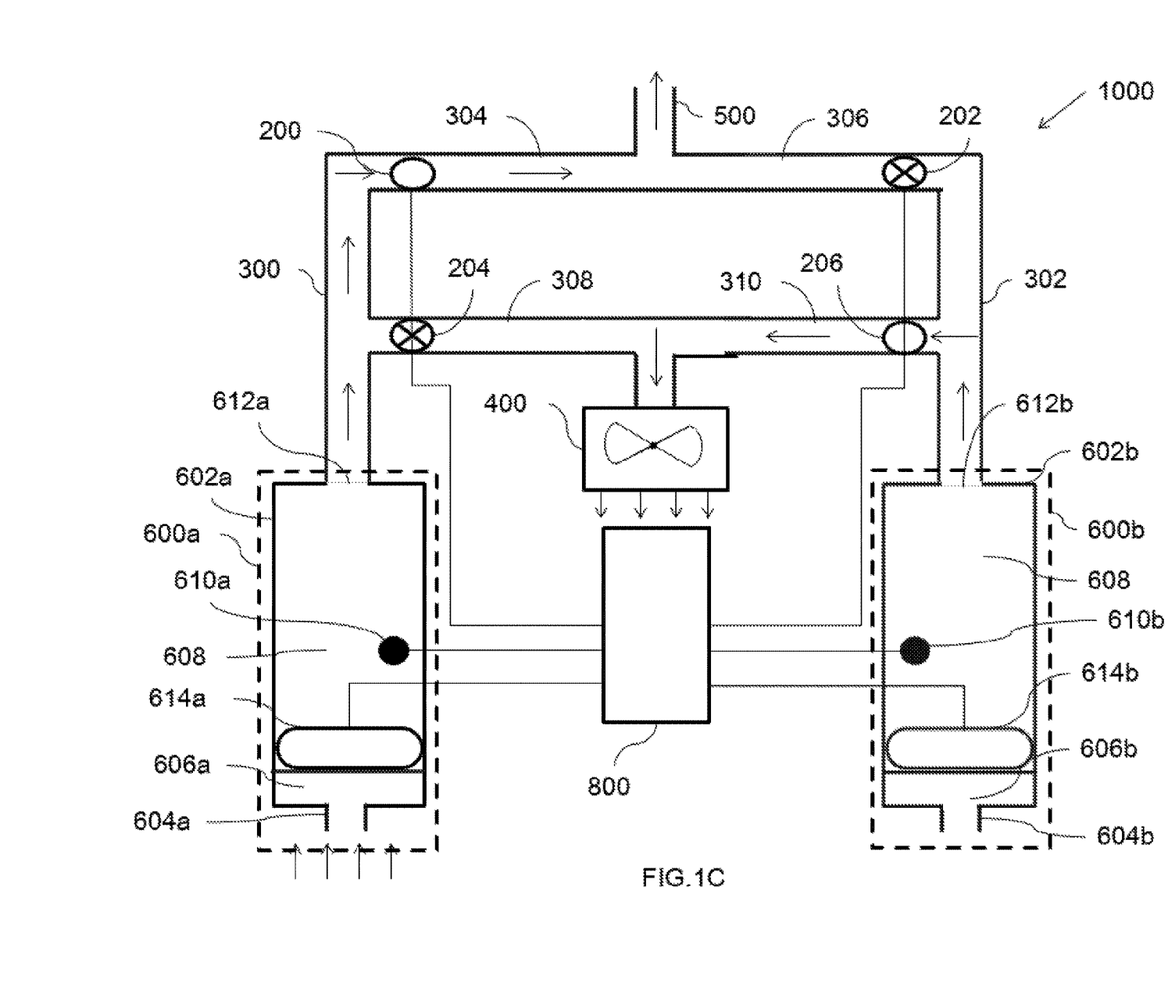
FIG. 1C is a schematic representation of the air breather, where the atmospheric air is flowing through the first breather and the second breather is regenerating, in accordance with the embodiment of present invention.

A schematic representation an air breather 1000 for dehumidifying atmospheric air entering the air breather 1000 is shown in FIG. 1, according to an illustrative embodiment of the invention. The air breather 1000 includes first and second breathers 600*a* and 600*b*, first, second, third and fourth valves, 200, 202, 204 and 206 (first through fourth valves 200-206), first, second, third, fourth, fifth and sixth conduits, 300, 302, 304, 306, 308 and 310 (first through sixth conduits 300-310), a ventilation fan 400 and a control unit 800. The control unit 800 can be a microcontroller, microprocessor with appropriate circuitry, or a programmable logic controller (PLC). The first and second breathers 600*a* and 600*b* include first and second desiccator tanks 602*a* and 602*b*, first and second inlets 604*a* and 604*b*, first and second air filters 606*a* and 606*b*, a moisture absorbent 608, first and second moisture sensors 610*a* and 610*b*, first and second outlets 612*a* and 612*b*, and first and second heating elements 614*a* and 614*b*.

The first air filter 606*a* and the first heating element 614*a* are placed at the first inlet 604*a*. The second air filter 606*b* and the second heating element 614*b* are placed at the second inlet 604*b*. The first and second moisture sensors 610*a* and 610*b* are placed inside the first and second breathers 600*a* and 600*b*, respectively. The common ventilation fan 400 is connected to the first and second outlets 612*a* and 612*b*. The first conduit 300 connects the first outlet 612*a* to the third and fifth conduits 304 and 308. The third conduit 304 connects to an inlet of oil tank 500 and the fifth conduit 308 connects to the ventilation fan 400. The second conduit 302 connects the second outlet 612*b* to the fourth and sixth conduits 306 and 310. The fourth conduit 306 connects to the inlet of oil tank 500 and the sixth conduit 310 connects to the ventilation fan 400. The first through fourth valves 200-206 are placed in the third through sixth conduits 304-310, respectively. The control unit 800 is connected to the first and second moisture sensors 610*a* and 610*b* for receiving the first and second moisture values, respectively. The control unit 800 is further connected to the first and second heating elements 614*a* and 614*b*, and the first through fourth valves 200-206. The control unit 800 receives first and second moisture values of the moisture absorbent 608 disposed in the first and second desiccator tanks 602*a* and 602*b*. Based on the first and second moisture values, the control unit 800 controls the first through fourth valves 200-206, and the first and second heating elements 614*a* and 614*b*.

The air breather 1000 is connected to an electrical device (not shown). The electrical device may be a power transformer that uses oil as a coolant and dielectric medium. The power transformer transmits alternating current (AC) power over a long distance. The power transformer includes a first voltage winding and a second voltage winding, wherein the first voltage winding is a low voltage winding and the second voltage winding is a high voltage winding. The power transformer is immersed in a tank that houses oil. When the AC power from the first voltage winding is transferred to the second voltage winding, heat is generated. The heat generated by the power transformer is transferred to the oil. The oil expands upon absorption of heat. A conservator tank in connection with the oil tank helps accommodate this volume change in the oil. The conservator tank is a part of the oil tank and contains some free space. When the oil expands, the air present in the conservator tank is pushed out of the conservation tank. The pushed out air from the conservator tank is made to pass through the air breather 1000.

The heat absorbed by the oil is dissipated to the environment via radiators, and the oil gradually cools down. When the oil cools down, it contracts, causing a decrease in the volume of the oil in the conservator tank. Due to the decrease in the volume of the oil inside the conservator tank, equivalent volume of atmospheric air is sucked in the conservator tank in order to equalize pressure with respect to that of the atmospheric pressure. As the atmospheric air contains moisture, and the moisture hinders the working of the electrical device, the atmospheric air sucked in the conservator tank is passed through the air breather.

In an embodiment of the present invention, the first and second desiccator tanks 602*a* and 602*b* are cylindrical in shape and are manufactured using acrylic or polycarbonate glass material or any other suitable material. Further, the first and second breathers 600*a* and 600*b* are not restricted to cylindrical shape and can be of any shape depending on the electrical devices that include the first and second breathers 600*a* and 600*b*.

The first and second inlets 604*a* and 604*b* allow the air to enter the first and second desiccator tanks 602*a* and 602*b*. In an embodiment, each of the first and second inlets 604*a* and 604*b* has a single way valve that is controlled by the control unit 800 to allow the air to flow based on requirements of the air breather 1000. In another embodiment, a two way valve controlled by the control unit 800 is installed at junction of the first and second inlets 604*a* and 604*b*. The two way valve controls the flow of the air to the desiccator tanks 602*a* and 602*b* based on requirements of the air breather 1000.

The air filters 606*a* and 606*b* may include any devices which are used to filter dust, dirt, existing in the atmospheric air. The air filters 606*a* and 606*b* could be normal sieve type filters which remove dirt/dust from the air. The air filters 606*a* and 606*b* are installed in the air breather 1000, as the air breather 1000 is an air sensitive device.

The moisture absorbent 608 may include any substance which has a tendency to absorb moisture from the air. For example, the moisture absorbent 608 may be a silica gel absorbent, a clay absorbent, and a calcium chloride absorbent. The silica gel absorbent is manufactured from sodium silicate and has a granular form. It is known to a person skilled in the art that the silica gel absorbent is more stable and has an excellent moisture absorbent capability. When the silica gel is exposed to temperatures near or higher to 50 to 60 degree Celsius, the moisture absorbed by the silica gel is evaporated and dissipated in the atmosphere.

The first and second moisture sensors 610a and 610b detect moisture absorbed by the moisture absorbent 608, and correspondingly generate an electrical output. The first and second moisture sensors 610a and 610b generate the electrical output if the moisture absorbed by the absorbent 608 crosses a threshold value. The electrical output is passed on the control unit 800.

The first and second heating elements 614a and 614b convert the input electrical energy to output thermal energy. The first and second heating elements 614a and 614b are in electrical communication with the control unit 800. The control unit 800 switches ON and OFF the first and second heating elements 614a and 614b as required. In an embodiment of the present invention, the first and second heating elements 614a and 614b are not shape specific and can be of any shape such as, spiral shape, U shape etc.

Figure 2:
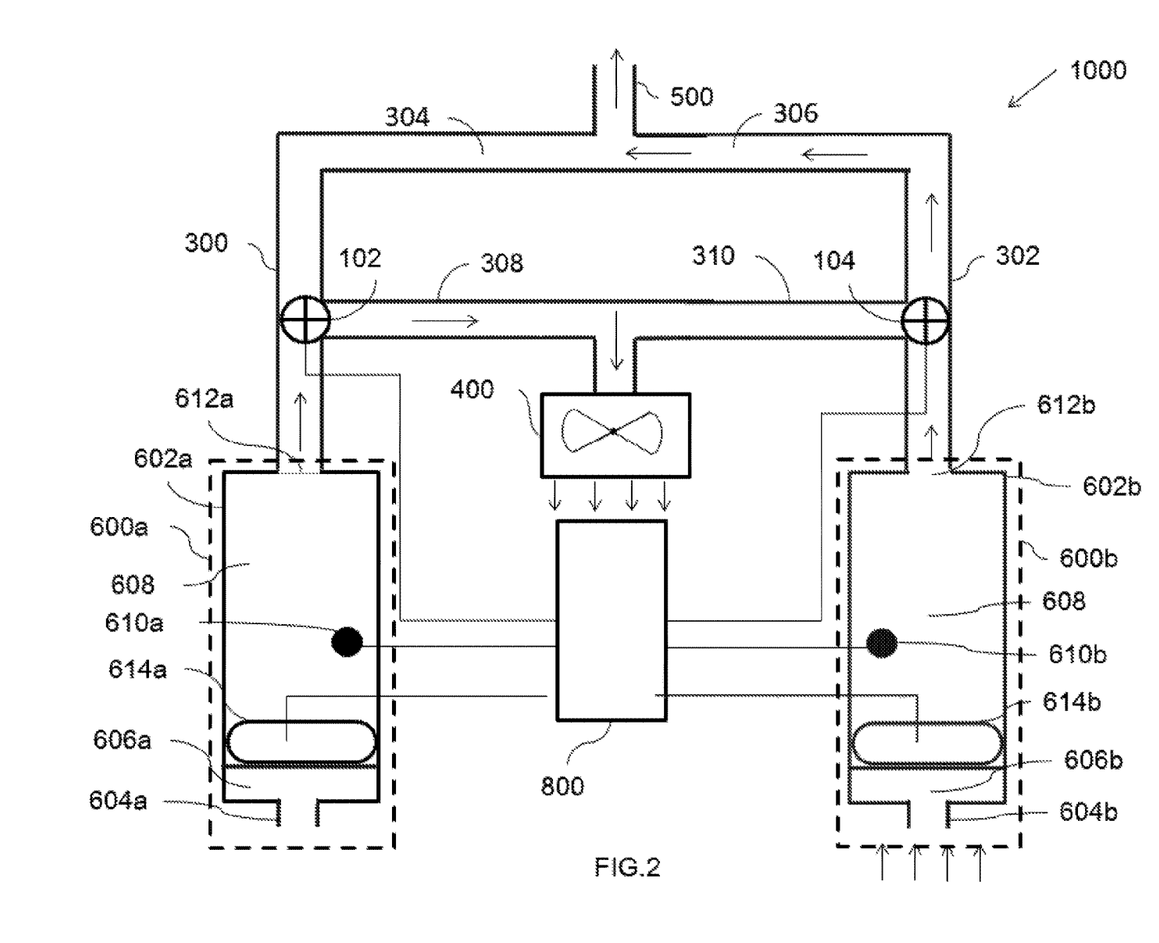
FIG. 2 is a schematic representation of the air breather with first and second two way valves, in accordance with the embodiment of present invention.

In an embodiment of the present invention, the first through fourth valves 200-206 are solenoid valves. Each solenoid valve includes an inlet port, an outlet port, a coil, a coil winding, a plunger, a spring and an orifice. Normally the solenoid valve is in OFF state as the solenoid valve uses the spring which presses the plunger tip against the opening of the orifice, restricting the air in the inlet of the solenoid valve to flow to the outlet of the solenoid valve. To switch ON the solenoid valve the plunger is lifted up by an electromagnetic field created by the coil, providing a way through which the air can flow towards outlet of the solenoid valve. According to the requirement, the control unit 800 switches ON and OFF the first through fourth valves 200-206. In another embodiment of present invention, instead of the first through fourth valves 200-206, first and second two way valves 102 and 104 can be used, as illustrated in FIG. 2.

When the oil inside the oil tank cools down by dissipating heat energy to the environment or due to reduction in electrical loads the volume of the oil inside the oil tank decreases. This causes the atmospheric air to enter into the inlet of the oil tank 500. The atmospheric air is passed through the air breather 1000. The atmospheric air is allowed to enter the first breather 600a and the second breather 600b is in idle state at this time instant, as shown in FIG. 1A. The atmospheric air enters the first desiccator tank 602a by way of the first inlet 604a. The atmospheric air entering the first desiccator tank 602a is passed through the first air filter 606a, to obtain dust free air. The dust free air is then allowed to pass through the moisture absorbent 608. The moisture absorbent 608 absorbs moisture present in the dust free air, till the dust free air dehumidifies completely. The dehumidified air is released to the first conduit 300 by way of the first outlet 612a. The dehumidified air enters the third conduit 304 from the first conduit 300 where the control unit 800 opens the first valve 200 so that the dehumidified air is released to the inlet of the oil tank 500. The first moisture sensor 610a continuously provides a first moisture value to the control unit 800. The first breather 600a supplies the dehumidified air to the inlet of the oil tank 500 till the first moisture value is below a threshold value.

If the first moisture value exceeds the threshold value, inhaling of the atmospheric air through the first breather 600a is terminated and regeneration process of the moisture absorbent 608 disposed in the first desiccator tank 602a is initiated. In the regeneration process, the moisture absorbent 608 is heated using the heating elements 614a and 614b till the moisture absorbed by the moisture absorbent 608 changes its state to hot air and evaporates. During regeneration process of the first breather 600a, the control unit 800 closes the first valve 200 and opens the third valve 204. Further, the control unit 800 switches ON the first heating element 614a to heat up the moisture absorbent 608 disposed in the first desiccator tank 602a, as shown in FIG. 1B.

Referring now to FIG. 1B, the second breather 600b supplies dehumidified air to the inlet of the oil tank 500 while the first breather 600a regenerates, as the first breather 600a is exhausted by absorbing moisture to its threshold. The atmospheric air is allowed to enter the second breather 600b. The atmospheric air is filtered through the second air filter 606b, to obtain the dust free air. The dust free air is passed through the moisture absorbent 608 disposed in second desiccator tank 602b. The moisture absorbent 608 absorbs the moisture present in the dust free air till the dust free air dehumidifies completely. The dehumidified air is then released to the second conduit 302 by way of second outlet 612b. The dehumidified air enters the fourth conduit 306 from the second conduit 302 where the control unit 800 opens the second valve 202 so that the dehumidified air is released to the inlet of the oil tank 500.

As the moisture absorbent 608 disposed in the first desiccator tank 602a is exhausted by absorbing moisture to its threshold, the first breather 600a regenerates. During regeneration process, the first heating element 614a heats the moisture absorbent 608 disposed in the first desiccator tank 602a. The moisture absorbed by the moisture absorbent 608 changes its state to vapour due to the hot air. As hot air with water vapours has a tendency to rise up, the hot air climbs up the first desiccator tank 602a. The ventilation fan 400 creates a partial vacuum environment inside the third conduit 308. The hot air is released to the first conduit 300 by way of the first outlet 612a. As the third valve 204 is opened, the hot air enters the fifth conduit 308 from the first conduit 300. The hot air along with vapours of the moisture absorbed by the moisture absorbent 608 is sucked by the ventilation fan 400 and is released out of the air breather 1000. The regeneration process continues till the moisture absorbent 608 disposed in the first desiccator tank 602a dehydrates completely. When dehydration process completes, the controller 800 switches "OFF" the heating element 614a and closes the third valve 204.

In the embodiment of FIG. 1B, the second moisture sensor 610b continuously provides a second moisture value to the control unit 800. For proper functioning of second air breather 600b, the second moisture value should ideally be under the threshold value. If the second moisture value exceeds the threshold value, inhaling of atmospheric air through the second breather 600b is terminated and the regeneration process of the moisture absorbent 608 disposed in the second desiccator tank 602b is initiated.

Referring to FIG. 1C, the control unit 800 opens the first and fourth valves 200 and 206, and closes the second and third valves 202 and 204. Further, the control unit 800 switch "ON" the second heating element 614b to heat the moisture absorbent 608. In FIG. 1C, the moisture absorbent 608 disposed in the first breather 600a is completely regenerated. The first breather 600a supplies dehumidified air to the inlet of oil tank 500 and the second breather 600b regenerates. The first breather 600a inhales the atmospheric air, dehydrates the atmospheric air by absorbing humidity present in the atmospheric air by the moisture absorbent 608 disposed in first desiccator tank 602a and the dehumidified air is released to the inlet of oil tank 500. Further, the heating element 614b heats the moisture absorbent 608 disposed in the second desiccator tank 602b to form hot air. The hot air along with vapours of the moisture absorbed by the moisture absorbent 608 is sucked and released out of the air breather 1000 by the ventilation fan 400, and the process continues.

According to the alternative embodiment shown in FIG. 2, a first two way valve 102 is placed in the first conduit 300 at junction of connection between the first conduit 300 and the fifth conduit 308. A second two way valve 104 is placed in the second conduit 302 at junction of connection between the second conduit 302 and the sixth conduit 310. The first and second two way valves 102 and 104 are controlled by the control unit 800. The first and second two way valves 102 and 104 can control air flow in two different conduits at same time. Considering the flow of air as shown in FIG. 2, the second breather 600*b* supplies dehumidified air to the inlet of the oil tank 500 and the first breather 600*a* regenerates, the first two way valve 102 closes the way to the oil tank 500 and opens the way to the fifth conduit 308, and the second two way valve 104 closes way to the sixth conduit 310 and opens way to the oil tank 500. This arrangement leads to cost reduction in the air breather 1000. Further, the above arrangement reduces the complexity of the air breather 1000.

The air breather 1000 is an efficient system and the time taken for complete dehydration of the moisture absorbent 608 is almost two times less than the other existing breathers. The ventilation fan 400 creates a partial vacuum and is placed at the top of the first and second breathers 600*a* and 600*b*. The hot air generated during the regeneration process, rises up the first and the second breathers 600*a* and 600*b*. The hot air is completely sucked and is released out of the air breather 1000, without allowing the hot air to condense inside the air breather 1000. The air breather 1000 needs to use only one ventilation fan 400. Thus, the cost of the air breather 1000 is reduced. Further, due to an effective ventilation of the absorbed moisture, the energy consumption of the air breather 1000 reduces substantially. The air breather 1000 has a simpler arrangement as compared to the air breathers of prior art since it is efficient, easy to manufacture, and is cost-effective.

The present invention has been described herein with reference to a particular embodiment for a particular application. Although selected embodiments have been illustrated and described in detail, it may be understood that various substitutions and alterations are possible. Those having ordinary skill in the art and access to the present teachings may recognize additional various substitutions and alterations are also possible without departing from the spirit and scope of the present invention, and as defined by the following claims.

What is claimed is:

1. An air breather, comprising:
a first breather, the first breather comprising:
a first desiccator tank having a first inlet and a first outlet, wherein the first desiccator tank receives air by way of the first inlet, and releases the air by way of the first outlet;
a moisture absorbent disposed in the first desiccator tank for absorbing moisture from air;
a first moisture sensor placed in the first desiccator tank, for sensing a first moisture value of the moisture absorbent; and
a first heating element placed at the first inlet for heating the moisture absorbent;
a second breather, the second breather comprising:

a second desiccator tank having a second inlet and a second outlet, wherein second desiccator tank receives air by way of the second inlet, and releases the air by way of the second outlet;
a moisture absorbent disposed in the second desiccator tank for absorbing moisture from air;
a second moisture sensor placed in the second desiccator tank, for sensing a second moisture value of the moisture absorbent; and
a second heating element placed at the second inlet for heating the moisture absorbent; and
a common ventilation fan connected to the first and second outlets for releasing the air from the first and second outlets by creating a partial vacuum inside the first and second breathers.

2. The air breather of claim 1, wherein the air breather is connected to an oil tank of an electrical device.

3. The air breather of claim 1, wherein the moisture absorbent present inside the first breather and the moisture absorbent present inside the second breather include one of a silica gel, a montmorillonite, calcium chloride, or a polyacrylamide.

4. The air breather of claim 1 further comprising, a first air filter placed at the first inlet and a second air filter placed at the second inlet, for filtering the air entering the first and second breathers.

5. The air breather of claim 2 further comprising, first, second, third, and fourth valves, and first, second, third, fourth, fifth and sixth conduits, wherein the first valve is placed in the third conduit connecting the first conduit and the oil tank, the second valve is placed in the fourth conduit connecting the second conduit and the oil tank, the third valve is placed in the fifth conduit connecting the first conduit and the ventilation fan, and the sixth valve is placed in the sixth conduit connecting the second conduit and the ventilation fan.

6. The air breather of claim 1 further comprising a control unit, wherein the control unit is connected to the first and second moisture sensors for receiving the first and second moisture values, respectively.

7. The air breather of claim 6, wherein the control unit is further connected to first, second, third and fourth valves for selectively activating first, second, third and fourth valves, and the first and second heating elements.

8. The air breather of claim 7, wherein the control unit opens the first and fourth valves, closes the second and third valves, and switches ON the second heating element when the second moisture value exceeds a threshold moisture value of the second breather.

9. The air breather of claim 7, wherein the control unit opens the second and third valves, closes the first and fourth valves, and switches ON the first heating element when the first moisture value exceeds a threshold moisture value of the first breather.

10. The air breather of claim 1, wherein the air received by way of the first and second inlets is atmospheric air which is dehumidified by the moisture absorbent, and the air released by way of the first and second outlets is dehumidified air.

11. The air breather of claim 1, wherein the air released by heating the moisture absorbent present inside the first breather is hot air.

12. The air breather of claim 1, wherein the air received by way of the first inlet is atmospheric air, the air released by way of the first outlet is dehumidified air, and the air released by the ventilation fan through the second outlet is hot air when the first heating element is switched OFF and the second heating element is switched ON.

13. The air breather of claim 1, wherein the air received by way of the second inlet is atmospheric air, the air released by way of the second outlet is dehumidified air, and the air released by the ventilation fan through the first outlet is hot air along with vapours of the moisture absorbed by the absorbent when the second heating element is switched OFF and first heating element is switched ON.

* * * * *